(12) United States Patent
Horst et al.

(10) Patent No.: US 10,966,544 B2
(45) Date of Patent: Apr. 6, 2021

(54) TRAVEL BASSINET

(71) Applicant: Wonderland Switzerland AG, Steinhausen (CH)

(72) Inventors: Andrew Horst, West Lawn, PA (US); Curtis M. Hartenstine, Birdsboro, PA (US); Patrick J. Bowers, Hockessin, DE (US); Ryan N. Miller, Lancaster, PA (US)

(73) Assignee: Wonderland Switzerland AG, Steinhausen (CH)

( * ) Notice: Subject to any disclaimer, the term of this patent is extended or adjusted under 35 U.S.C. 154(b) by 268 days.

(21) Appl. No.: 15/867,733

(22) Filed: Jan. 11, 2018

(65) Prior Publication Data

US 2018/0192785 A1 Jul. 12, 2018

Related U.S. Application Data

(60) Provisional application No. 62/444,924, filed on Jan. 11, 2017, provisional application No. 62/489,850, (Continued)

(51) Int. Cl.
| | |
|---|---|
| *A47D 7/04* | (2006.01) |
| *A47D 9/00* | (2006.01) |
| *A47D 13/06* | (2006.01) |
| *A47D 7/00* | (2006.01) |
| *A47D 11/00* | (2006.01) |
| *A47D 15/00* | (2006.01) |
| *F16B 12/40* | (2006.01) |

(Continued)

(52) U.S. Cl.
CPC ............ *A47D 9/005* (2013.01); *A47D 7/005* (2013.01); *A47D 7/007* (2013.01); *A47D 7/04* (2013.01); *A47D 11/007* (2013.01); *A47D 13/06* (2013.01); *A47D 15/00* (2013.01); *F16B 12/40* (2013.01); *F16B 12/44* (2013.01); *F16B 12/56* (2013.01)

(58) Field of Classification Search
CPC .......... A47D 7/005; A47D 7/007; A47D 7/04; A47D 7/00; A47D 9/005; A47D 13/06; A47D 13/063; A47D 13/066
See application file for complete search history.

(56) References Cited

U.S. PATENT DOCUMENTS

| | | | |
|---|---|---|---|
| 949,389 | A | 2/1910 | Almgren |
| 4,483,026 | A | 11/1984 | Kassai |

(Continued)

FOREIGN PATENT DOCUMENTS

| | | |
|---|---|---|
| CN | 2337866 Y | 9/1999 |
| CN | 2561300 Y | 7/2003 |

(Continued)

*Primary Examiner* — Peter M. Cuomo
*Assistant Examiner* — Ifeolu A Adeboyejo
(74) *Attorney, Agent, or Firm* — Winston Hsu

(57) ABSTRACT

A travel bassinet includes a first side structure, a second side structure, a fixed end structure and a pivoting end panel. The fixed end structure is disposed between ends of the first side structure and the second side structure. The pivoting end panel is movably disposed between the first side structure and the second side structure and opposite to the fixed end structure. The pivoting end panel is utilized to switch between a first operation mode and a second operation mode for adjusting an accommodating space of the travel bassinet.

19 Claims, 17 Drawing Sheets

Related U.S. Application Data filed on Apr. 25, 2017, provisional application No. 62/599,320, filed on Dec. 15, 2017.

(51) Int. Cl.
*F16B 12/44* (2006.01)
*F16B 12/56* (2006.01)

(56) References Cited

U.S. PATENT DOCUMENTS

| | | | | |
|---|---|---|---|---|
| 6,418,575 | B1* | 7/2002 | Cheng | A47D 7/002 |
| | | | | 5/93.1 |
| 6,470,515 | B1* | 10/2002 | Hsia | A47D 13/063 |
| | | | | 135/120.3 |
| 6,526,608 | B1* | 3/2003 | Hsia | A47D 7/04 |
| | | | | 5/93.1 |
| 7,600,276 | B2* | 10/2009 | Chen | A47D 13/063 |
| | | | | 5/93.1 |
| 9,345,339 | B2* | 5/2016 | Wang | A47D 7/04 |
| 2009/0113625 | A1* | 5/2009 | Hutchinson | A47D 7/04 |
| | | | | 5/93.1 |
| 2012/0233770 | A1* | 9/2012 | Greger | A47D 9/00 |
| | | | | 5/98.1 |
| 2014/0047639 | A1 | 2/2014 | Cheng | |
| 2014/0208505 | A1* | 7/2014 | Burkholder | A47D 9/005 |
| | | | | 5/99.1 |
| 2014/0283298 | A1 | 9/2014 | Cheng | |

FOREIGN PATENT DOCUMENTS

| | | |
|---|---|---|
| CN | 201208098 Y | 3/2009 |
| CN | 101444382 A | 6/2009 |
| CN | 201341648 Y | 11/2009 |
| CN | 201822384 U | 5/2011 |
| CN | 103859873 A | 6/2014 |
| CN | 205214815 U | 5/2016 |
| DE | 295 13 579 U1 | 11/1995 |
| DE | 200 00 537 U1 | 8/2000 |
| DE | 20 2007 008 992 U1 | 11/2007 |
| EP | 0 692 209 A1 | 1/1996 |
| EP | 2 820 977 A1 | 1/2015 |
| GB | 180522 | 6/1922 |

* cited by examiner

TRAVEL BASSINET

CROSS REFERENCE TO RELATED APPLICATIONS

This application claims the benefit of U.S. provisional application No. 62/444,924 (which was filed on Jan. 11, 2017), U.S. provisional application No. 62/489,850 (which was filed on Apr. 25, 2017), and U.S. provisional application No. 62/599,320 (which was filed on Dec. 15, 2017). The disclosures of the prior applications are incorporated herein by reference herein in their entirety.

BACKGROUND OF THE INVENTION

1. Field of the Invention

The present invention relates to a travel bassinet, and more particularly, to a travel bassinet with folding and unfolding functions for easy convenience.

2. Description of the Prior Art

A play yard frame provides an enclosed region where a young child can play and sleep inside, and a conventional bassinet can be put on an upper level of top rails of the play yard frame to elevate a bottom surface of the bassinet for the young child to play and sleep. However, the current location of assembly of the play yard frame and the conventional bassinet limits the caregiver's sight of the young child from a side of the said assembly; dimensions of the conventional bassinet are smaller than dimensions of the play yard frame, and the child's region of activity is constrained due to the stationary barrier of the play yard frame and the conventional bassinet.

SUMMARY OF THE INVENTION

The present invention provides a travel bassinet with folding and unfolding functions for easy convenience for solving above drawbacks.

According to the claimed invention, the travel bassinet includes a lower frame and an upper frame assembled with the lower frame. The lower frame includes a pivoting joint module, a first structural member, a second structural member and a plurality of legs. The first structural member is pivotally connected with the pivoting joint module, and the first structural member is adapted to switch between a folded position and an unfolded position. The second structural member is pivotally connected with the pivoting joint module and opposite to the first structural member, and the second structural member is adapted to switch between the folded position and the unfolded position. The plurality of legs includes a first leg and a second leg pivotally connected with two ends of the first structural member, and further includes a third leg and a fourth leg pivotally connected with two ends of the second structural member. The upper frame includes a plurality of holders, a fixed end structure, and a foot structure. The plurality of holders includes a first holder and a second holder respectively disposed on the first leg and the second leg, and further includes a third holder and a fourth holder respectively disposed on the third leg and the fourth leg. Two ends of the fixed end structure are respectively disposed on the first holder and the second holder. The foot structure is connected between the third holder and the fourth holder. The foot structure is moved far from the fixed end structure while the first structural member and the second structural member are switched to the unfolded position, and is further moved close to the fixed end structure while the first structural member and the second structural member are switched to the folded position.

According to the claimed invention, the pivoting joint module is lifted and lowered to switch the first structural member and the second structural member between the folded position and the unfolded position. The upper frame further includes a pivoting end panel pivotally connected with the foot structure, and the pivoting end panel is rotated to an upward position for enclosing an accommodating space of the travel bassinet and further rotated to a downward position for enlarging the accommodating space. The pivoting end panel comprises a main body and a hinge portion, and the hinge portion is disposed on an edge of the main body and engaged with the foot structure.

According to the claimed invention, the pivoting end panel includes a main body, a support foot, a support foot latch, a panel latch and a release handle. The support foot is rotatably disposed on the main body. The support foot latch is movably disposed on the main body. The panel latch is movably disposed on the main body. The release handle is slidably disposed on the main body and connected with the support foot latch and the panel latch. The release handle stays in a lock position to contact the support foot latch against the support foot so as to keep the support foot in a hiding position, and further to engage the panel latch with an engaging portion disposed on one of the third holder and the fourth holder so as to fasten the pivoting end panel on the upward position. The release handle is moved from the lock position to an unlock position to disengage the panel latch from the engaging portion, and further to separate the support foot latch from the support foot. The pivoting end panel further comprises a torsional spring disposed between the support foot and the main body, and a recovering force of the torsional spring is adapted to rotate the support foot from a hiding position to an exposing position. The pivoting end panel is covered by fabric material.

According to the claimed invention, the upper frame further includes a first side structure and a second side structure respectively located between the fixed end structure and the foot structure. The first side structure and the second side structure are detachably disposed on the plurality of holders. The upper frame further includes a plurality of corner uprights respectively disposed on the plurality of holders, and the first side structure and the second side structure are connected with the fixed end structure and the foot structure via the plurality of corner uprights.

According to the claimed invention, the side structure includes a pivot portion and two bar portions, and two ends of each bar portion are respectively connected with the pivot portion and one of plurality of corner uprights. The two bar portions are parallel while the first structural member and the second structural member stay in the unfolded position, and are rotated relative to the pivot portion in a non-parallel state while the first structural member and the second structural member stay in the folded position. The two bar portions are rotated downwardly or laterally while the first structural member and the second structural member are switched from the unfolded position to the folded position. The pivoting joint module is moved upward to drive rotation of the two bar portions relative to the pivot portion, so as to approach the fixed end structure and the foot structure by folding the first structural member and the second structural member accordingly.

According to the claimed invention, the pivoting joint module includes a plate portion with two axle holes, and the first structural member and the second structural member are respectively assembled with the two axle holes. The pivoting joint module further includes a protruding portion disposed under the plate portion. The first structural member and the second structural member are folded and unfolded vertically to approach the fixed end structure and the foot structure.

According to the claimed invention, the pivoting joint module includes a central pivot portion, two bridging pivot portions and two linking portions. Each of the linking portions is connected between the central pivot portion and one of the bridging pivot portions, and any of the bridging pivot portions is connected between the first structural member and the second structural member. The central pivot portion is moved upward to lift the two linking portions and to close the two bridging pivot portions, the first structural member and the second structural member are rotated relative to the two bridging pivot portions and the plurality of legs, so as to approach the fixed end structure and the foot structure. The first structural member and the second structural member are folded and unfolded horizontally to approach the fixed end structure and the foot structure.

According to the claimed invention, the first side structure includes a first bar portion, a second bar portion and a joint portion. The first bar portion and the second bar portion are respectively disposed on the fixed end structure and the foot structure in a rotatable manner, and the joint portion is disposed on the second bar portion and detachably assembled with the first bar portion. The first bar portion includes a constraining slot, and the fixed end structure includes a protrusion slidably located inside the constraining slot to constrain rotation of the first bar portion. One of the upper frame and the lower frame is attached to a play yard frame to suspend the travel bassinet above a floor.

According to the claimed invention, the travel bassinet includes a first side structure, a second side structure, a fixed end structure and a pivoting end panel. The fixed end structure is disposed between ends of the first side structure and the second side structure. The pivoting end panel is movably disposed between the first side structure and the second side structure and opposite to the fixed end structure. The pivoting end panel is utilized to switch between a first operation mode and a second operation mode for adjusting an accommodating space of the travel bassinet. The pivoting end panel is rotatably assembled with the first side structure and the second side structure, or is detachably assembled with the first side structure and the second side structure. The pivoting end panel is switched to the first operation mode to enclose the accommodating space, and is further switched to the second operation mode to enlarge the accommodating space. The travel bassinet is put on a floor or attached to a play yard frame for suspending above the floor.

The present invention provides the travel bassinet having for use positions, and the lower frame and the upper frame of the travel bassinet can be adjusted according to the designated use position. The first use position is the travel bassinet can be put on the floor with the enclosed pivoting end panel; the second use position is the pivoting end panel can be removed from or unfolded relative to the travel bassinet put on the floor for the enlarged accommodating space; the third use position is the travel bassinet can be attached to the play yard frame at the low level position; and the fourth use position is travel bassinet can be attached to the play yard frame at the high level position. The lower frame and the upper frame are made by several foldable units, so the lower frame and the upper frame can be easily folded for easy transport of the travel bassinet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
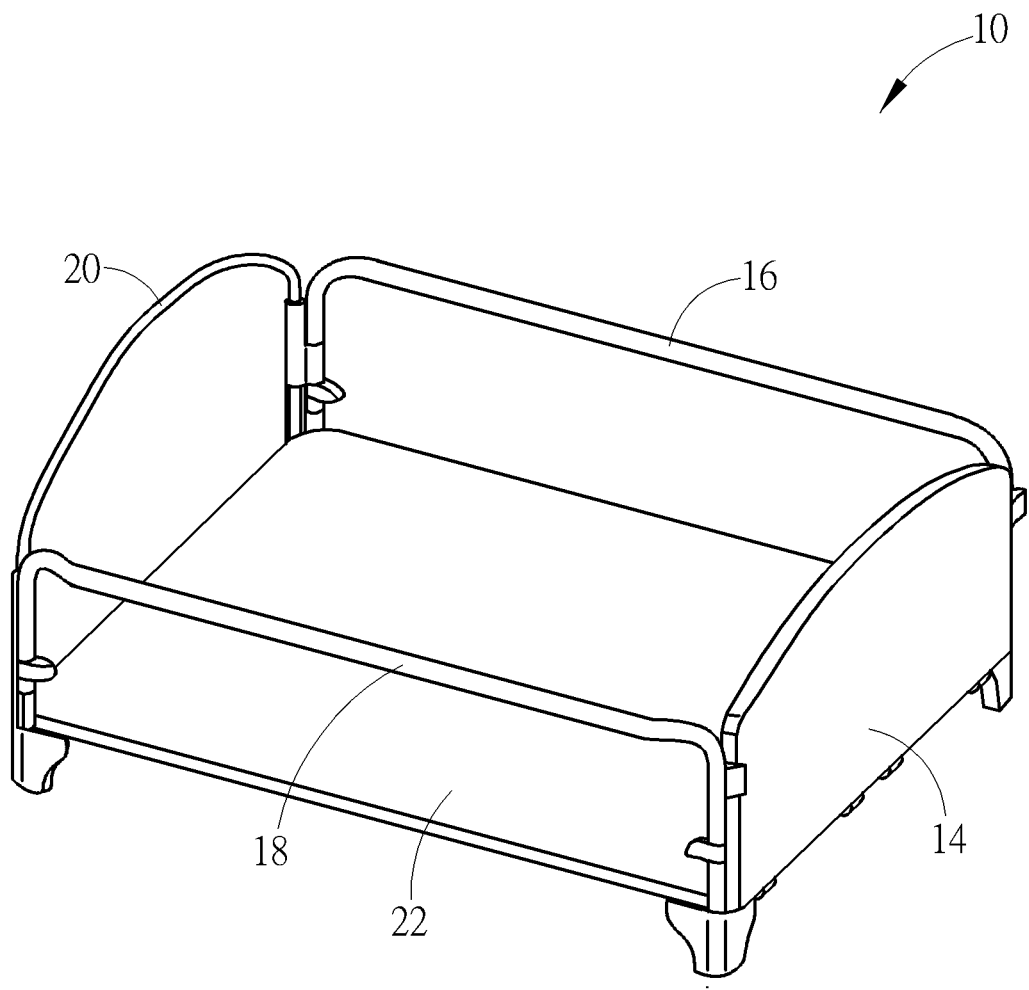
FIG. 1 is a diagram of a travel bassinet in a first operation mode according to an embodiment of the present invention.
Figure 2:
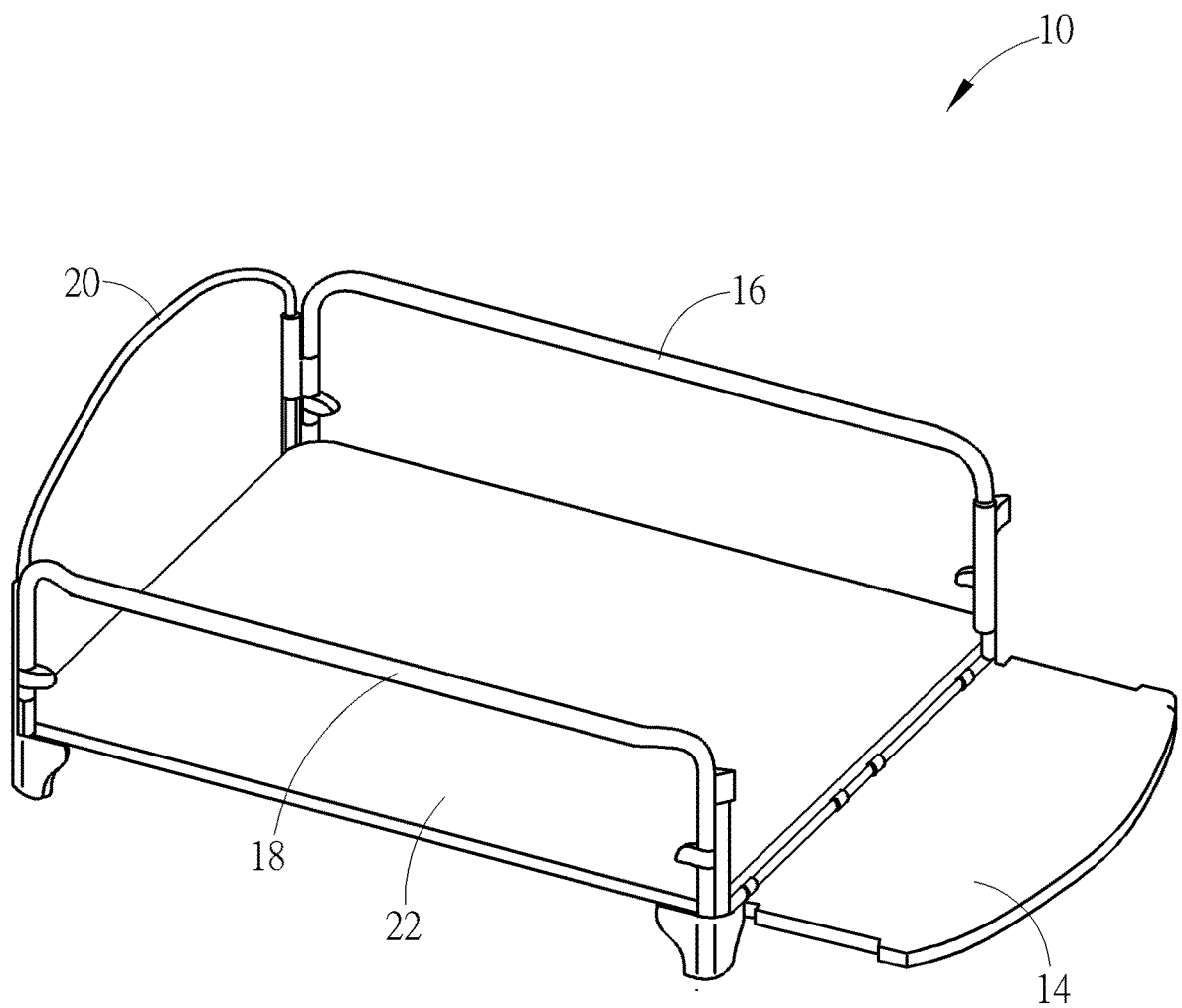
FIG. 2 is a diagram of the travel bassinet n a second operation mode according to the embodiment of the present invention.
Figure 3:
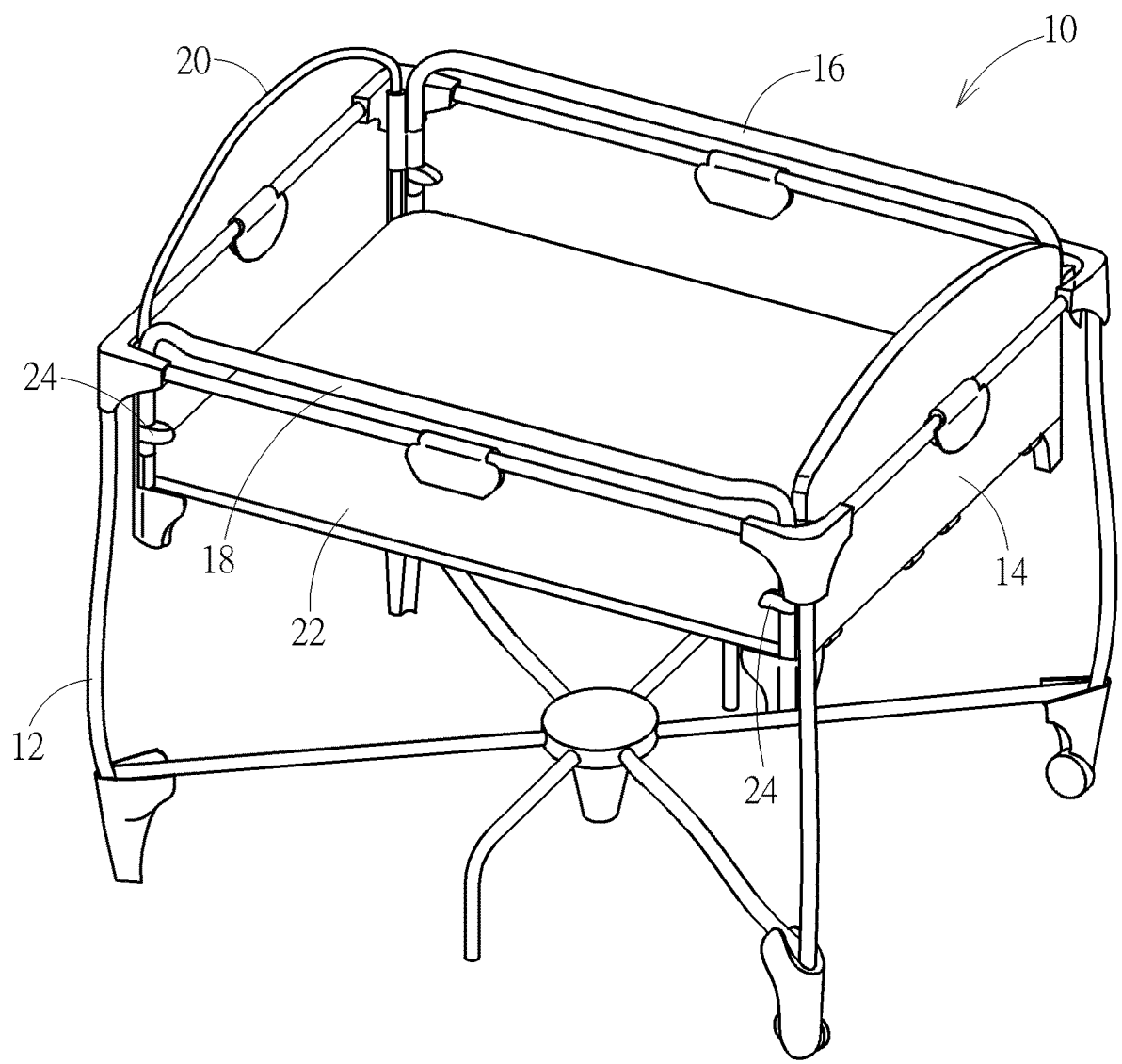
FIG. 3 and FIG. 4 respectively are diagrams of the travel bassinet attached to a play yard frame in different operation modes according to the embodiment of the present invention.
Figure 4:
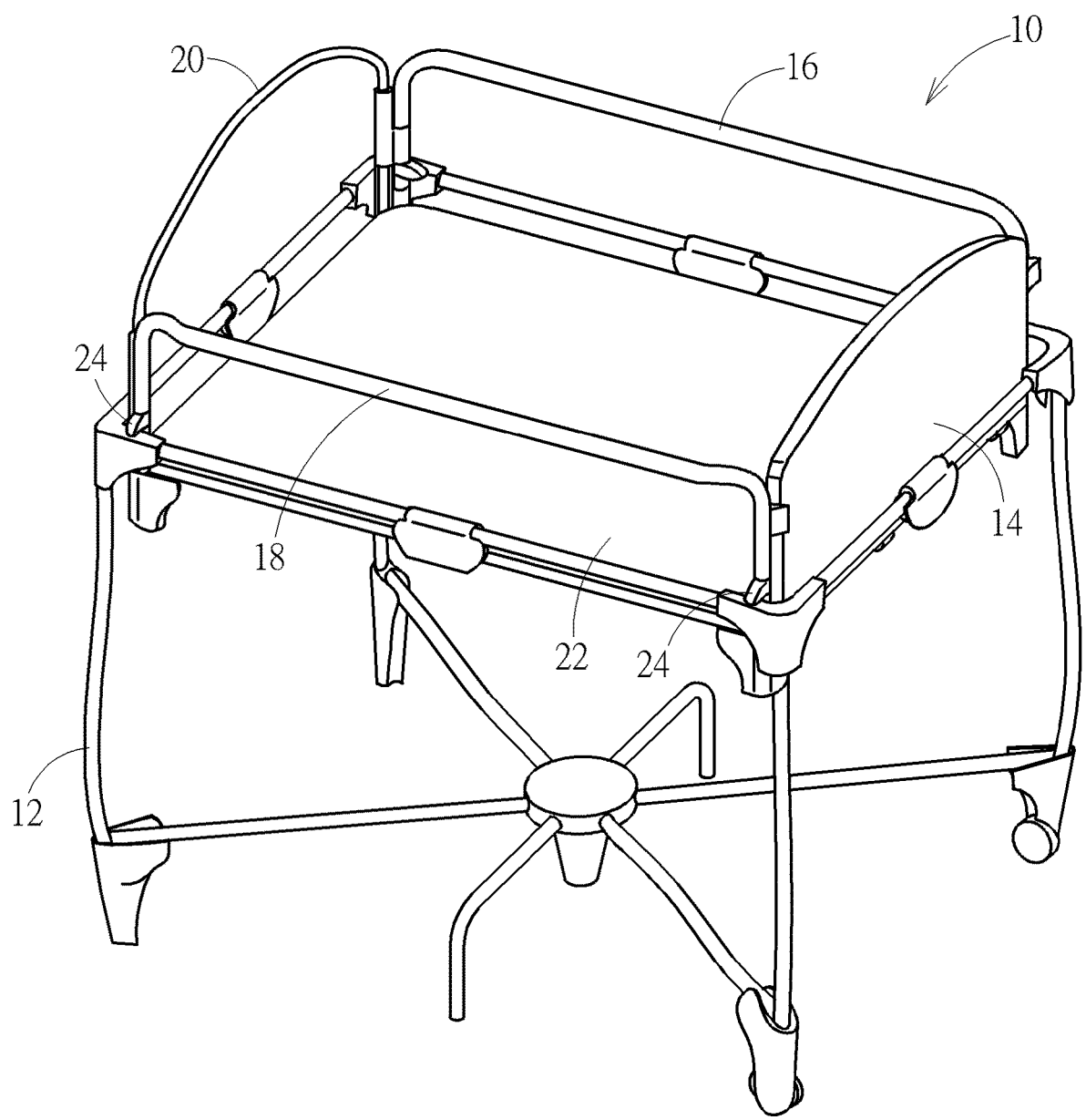

Please refer to FIG. 1 to FIG. 4. FIG. 1 is a diagram of a travel bassinet 10 in a first operation mode according to an embodiment of the present invention. FIG. 2 is a diagram of the travel bassinet 10 in a second operation mode according to the embodiment of the present invention. FIG. 3 and FIG. 4 respectively are diagrams of the travel bassinet 10 attached to a play yard frame 12 in different operation modes according to the embodiment of the present invention. Soft goods can be laid down on the accommodating space inside the travel bassinet 10. In the first operation mode, a pivoting end panel 14 is used to enclose the accommodating space; in the second operation mode, the pivoting end panel 14 is rotated, unfolded or removed to enlarge the accommodating space. Further, the travel bassinet 10 can be attached to the play yard frame 12 at high level position and low level position for different operation modes.

The travel bassinet 10 includes the pivoting end panel 14, a first side structure 16, a second side structure 18 and a fixed end structure 20. The fixed end structure 20 is disposed between ends of the first side structure 16 and the second side structure 18. The pivoting end panel 14 is movably disposed between the first side structure 16 and the second side structure 20 and opposite to the fixed end structure 20. The pivoting end panel 14 can be switched between the first operation mode shown in FIG. 1 and the second operation mode shown in FIG. 2 for adjusting a region of activity inside the accommodating space. A mattress 22 (which may be one of the foresaid soft goods) can be disposed inside the travel bassinet 10 for comfort; moreover, the travel bassinet 10 may dispose fabric material on the pivoting end panel 14, the first side structure 16, the second side structure 18 and the fixed end structure 20 to create safety space for child. The travel bassinet 10 can be put on a floor as purposes of a bassinet or a child bed, and the pivoting end panel 14 has a support foot standing on the floor so as to level a surface of the pivoting end panel 14 with the mattress 22.

The travel bassinet 10 is attached to the play yard frame 12 for suspending above the floor. As shown in FIG. 3, the travel bassinet 10 can be attached to the play yard frame 12 at the low level position; the travel bassinet 10 may stay on the low level position by abutting against construction of the play yard frame 12. For example, a lower framework and an upper framework circled by the pivoting end panel 14, the first side structure 16, the second side structure 18 and the fixed end structure 20 have dissimilar dimensions, and a top size of the play yard frame 12 may be larger than the lower framework but smaller than the upper framework, so the lower framework passes deep into the play yard frame 12 and the upper framework abuts against the play yard frame 12. As shown in FIG. 4, the travel bassinet 10 can be attached to the play yard frame 12 at the high level position, and the travel bassinet 10 optionally includes a contacting portion 24 abutted against the play yard frame 12 to steady the travel bassinet 10 on the high level position. The contacting portion 24 is rotated to be distant from the play yard frame 12 while the travel bassinet 10 is switched to the low level operation mode shown in FIG. 3.

Figure 5:
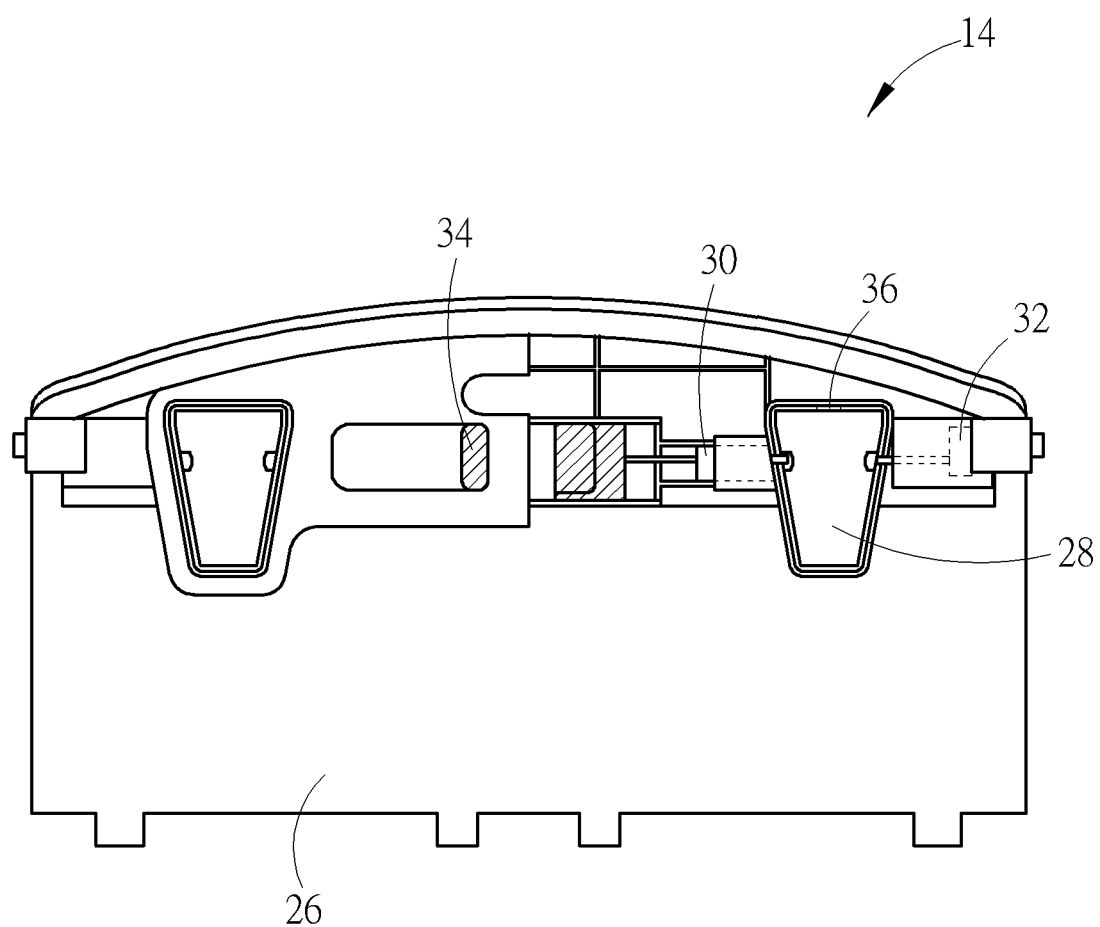
FIG. 5 is a diagram of a pivoting end panel according to the embodiment of the present invention.

Please refer to FIG. 5. FIG. 5 is a diagram of the pivoting end panel 14 according to the embodiment of the present invention. The pivoting end panel 14 includes a main body 26, a support foot 28, a support foot latch 30, a panel latch 32, a release handle 34 and a torsional spring 36. The support foot 28 is rotatably disposed on the main body 26, and used to stand on the floor while the travel bassinet 10 is switched to the second operation mode. The support foot latch 30 is movably disposed on the main body 26 and utilized to detachably engage with the support foot 28. The panel latch 32 is movably disposed on the main body 26 and utilized to detachably engage with an engaging portion (which is not shown in figures) disposed on at least one of the first side structure 16 and the second side structure 18. The torsional spring 36 is disposed between the support foot 28 and the main body 26, and a recovering force of the torsional spring 36 is adapted to rotate the support foot 28 from a hiding position (which is accommodated into a sunken portion on the main body 26) to an exposing position (which protrudes from the sunken portion).

The release handle 34 is slidably disposed on the main body 26 and connected with the support foot latch 30 and the panel latch 32. While the release handle 34 stays in a lock position, the support foot latch 30 can contact against the support foot 28 by engagement to keep the support foot 28 in the hiding position, as shown in FIG. 5, and the panel latch 32 is engaged with at least one of the first side structure 16 and the second side structure 18 to fasten the pivoting end panel 14 on an upward position, as shown in FIG. 1. While the release handle 34 is moved from the lock position to an unlock position, such as being moved to left from an initial position shown in FIG. 5, the panel latch 32 is disengaged from the first side structure 16 or the second side structure 18, and the support foot latch 30 is separated from the support foot 28; the pivoting end panel 14 can be rotated from the upward position to a downward position, and the support foot 28 can be switched from the hiding position to the exposing position for standing on the floor, as shown in FIG. 2.

Figure 6:
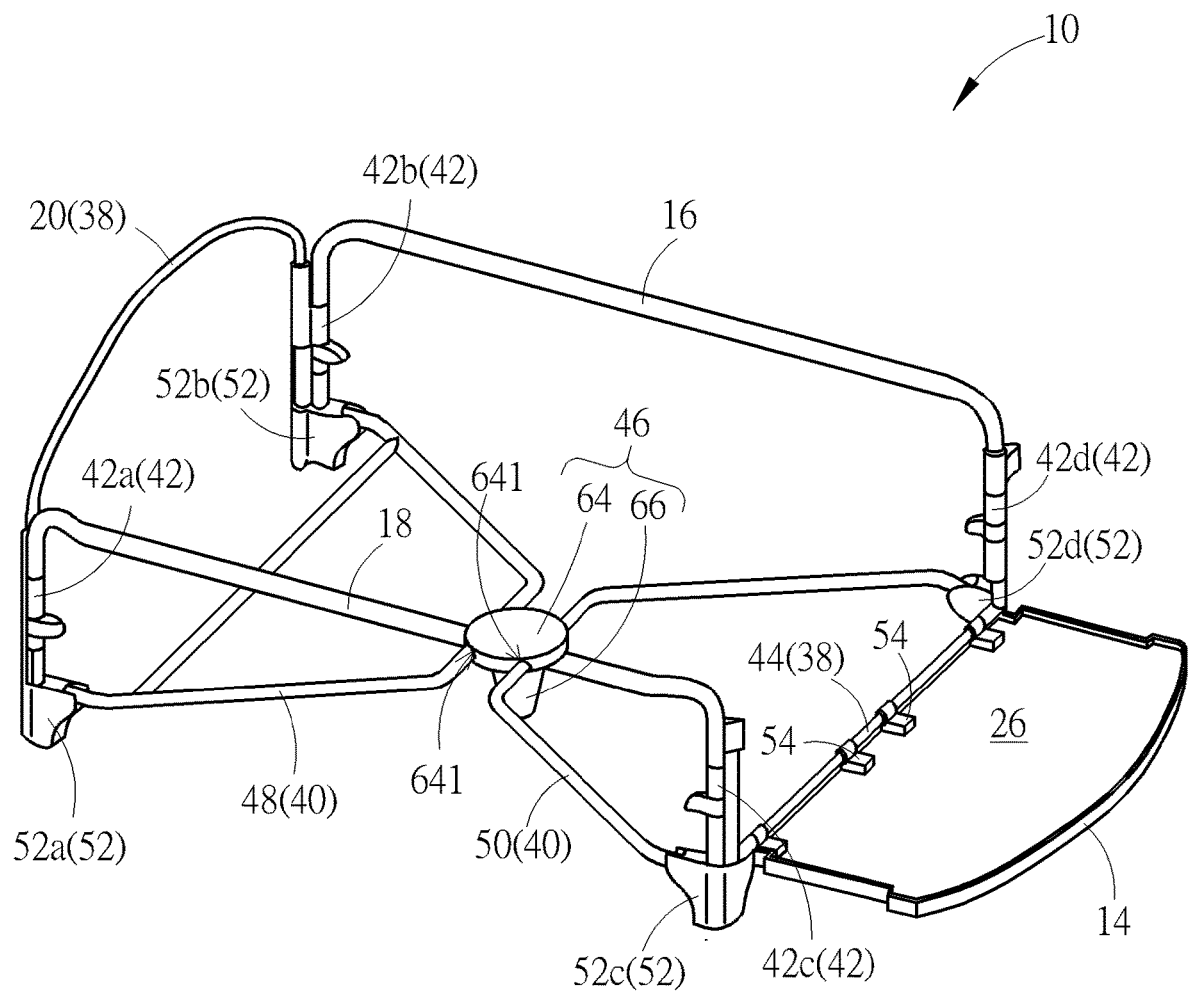
FIG. 6 and FIG. 7 respectively are diagrams of the travel bassinet indifferent operation modes according to a first embodiment of the present invention.
Figure 7:
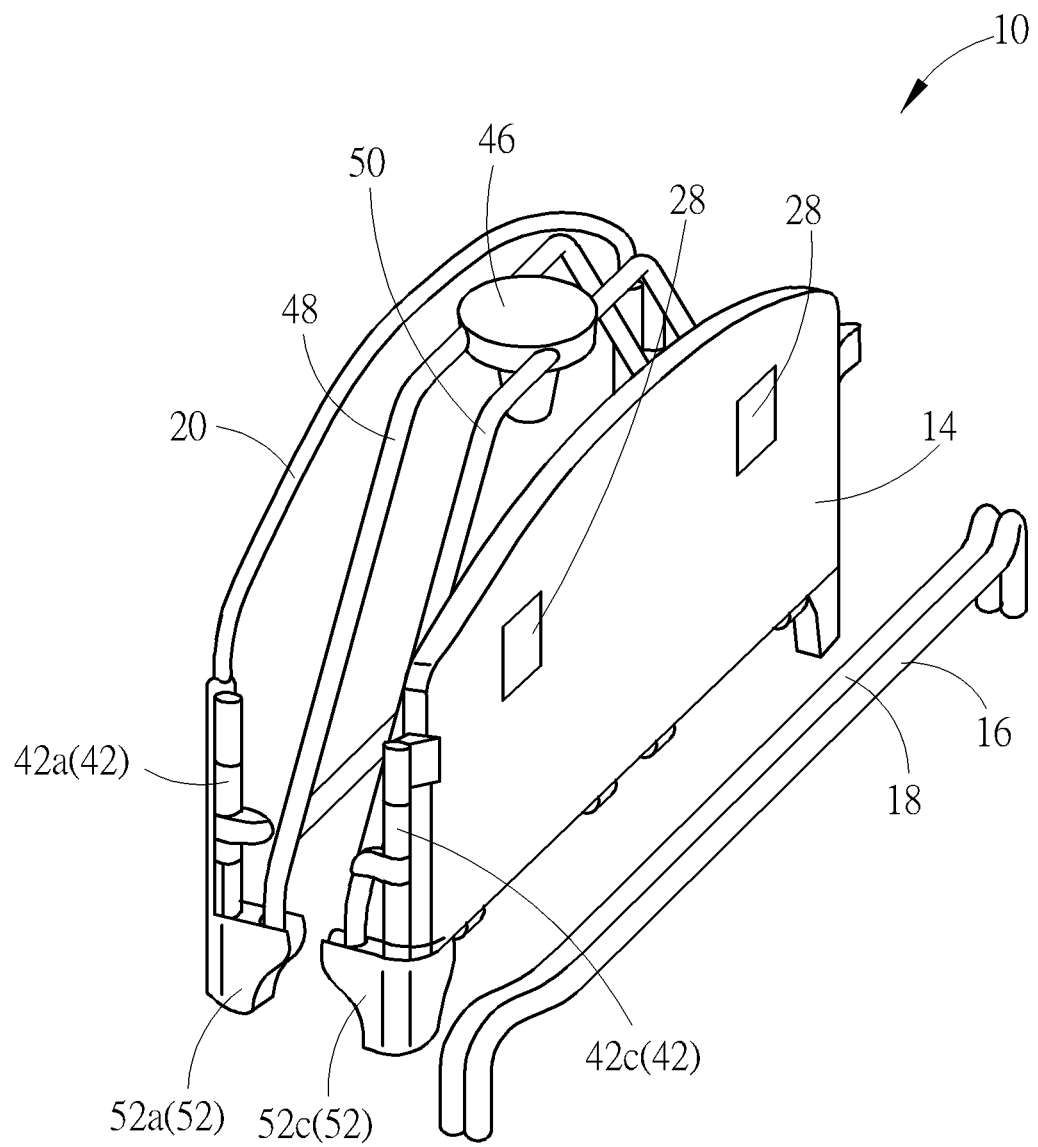

Please refer to FIG. 6 and FIG. 7. FIG. 6 and FIG. 7 respectively are diagrams of the travel bassinet 10 in different operation modes according to a first embodiment of the present invention. The travel bassinet 10 has an upper frame 38 and a lower frame 40 assembled with each other. The upper frame 38 may include the pivoting end panel 14, the first side structure 16, the second side structure 18, the fixed end structure 20, a plurality of holders 42 and a foot structure 44; the lower frame 40 may include a pivoting joint module 46, a first structural member 48, a second structural member 50 and a plurality of legs 52. The pivoting end panel 14 is pivotally connected with the foot structure 44, and can be rotated to the upward position for enclosing the accommodating space and further rotated to the downward position for enlarging the accommodating space. In another possible embodiment, the pivoting end panel 14 may be removed from the foot structure 44 to switch between the upward position and the downward position.

For example, the pivoting end panel 14 includes a hinge portion 54 disposed on an edge of the main body 26. The hinge portion 54 can be an enclosed structure engaged with the foot structure 44, so that the pivoting end panel 14 can be switched between the upward position and the downward position in a rotatable manner. Besides, the hinge portion 54 can be a C-typed structure engaged with the foot structure 44, and the pivoting end panel 14 can be switched between the upward position and the downward position in the rotatable manner or in a detachable manner.

The first structural member 48 and the second structural member 50 are opposite and pivotally connected with the pivoting joint module 46. The first structural member 48 and the second structural member 50 can be switched between a folded position (as shown in FIG. 7) and an unfolded position (as shown in FIG. 6). The legs 52 includes a first leg 52a and a second leg 52b pivotally connected with two ends of the first structural member 48, and a third leg 52c and a fourth leg 52d pivotally connected with two ends of the second structural member 50. Accordingly, the holders 42 includes a first holder 42a and a second holder 42b respectively disposed on the first leg 52a and the second leg 52b, and a third holder 42c and a fourth holder 42d respectively disposed on the third leg 52c and the fourth leg 52d. The fixed end structure 20 is disposed between the first side structure 16 and the second side structure 18 via the first holder 42a and the second holder 42b, and the foot structure 44 may be connected between the third holder 42c and the fourth holder 42d or be a part of the second structural member 50 located between the third leg 52c and the fourth leg 52d.

In the first embodiment, the first side structure 16 and the second side structure 18 are detachably disposed on the plurality of holders 42. The pivoting joint module 46 can include a plate portion 64 with two axle holes 641, and a protruding portion 66 disposed under the plate portion 64. The plate portion 64 is used to support the mattress 22, and the protruding portion 66 is used to stand on the floor. The first structural member 48 and the second structural member 50 are respectively assembled with the two axle holes 641. The first side structure 16 and the second side structure 18 can be removed from the holders 42 and then the pivoting joint module 46 can be lifted to rotate the first structural member 48 and the second structural member 50; therefore, the first structural member 48 and the second structural member 50 can be switched from the unfolded position to the folded position, and the foot structure 44 (and the pivoting end panel 14) is/are moved close to the fixed end structure 20, as shown in FIG. 7. For inverse process, the pivoting joint module 46 can be lowered to switch the first structural member 48 and the second structural member 50 from the folded position to the unfolded position, and the foot structure 44 (and the pivoting end panel 14) is/are moved far from the fixed end structure 20, as shown in FIG. 6; the first side structure 16 and the second side structure 18 can be reset into the holders 42 to steady the travel bassinet 10 in the unfolded position.

Figure 8:
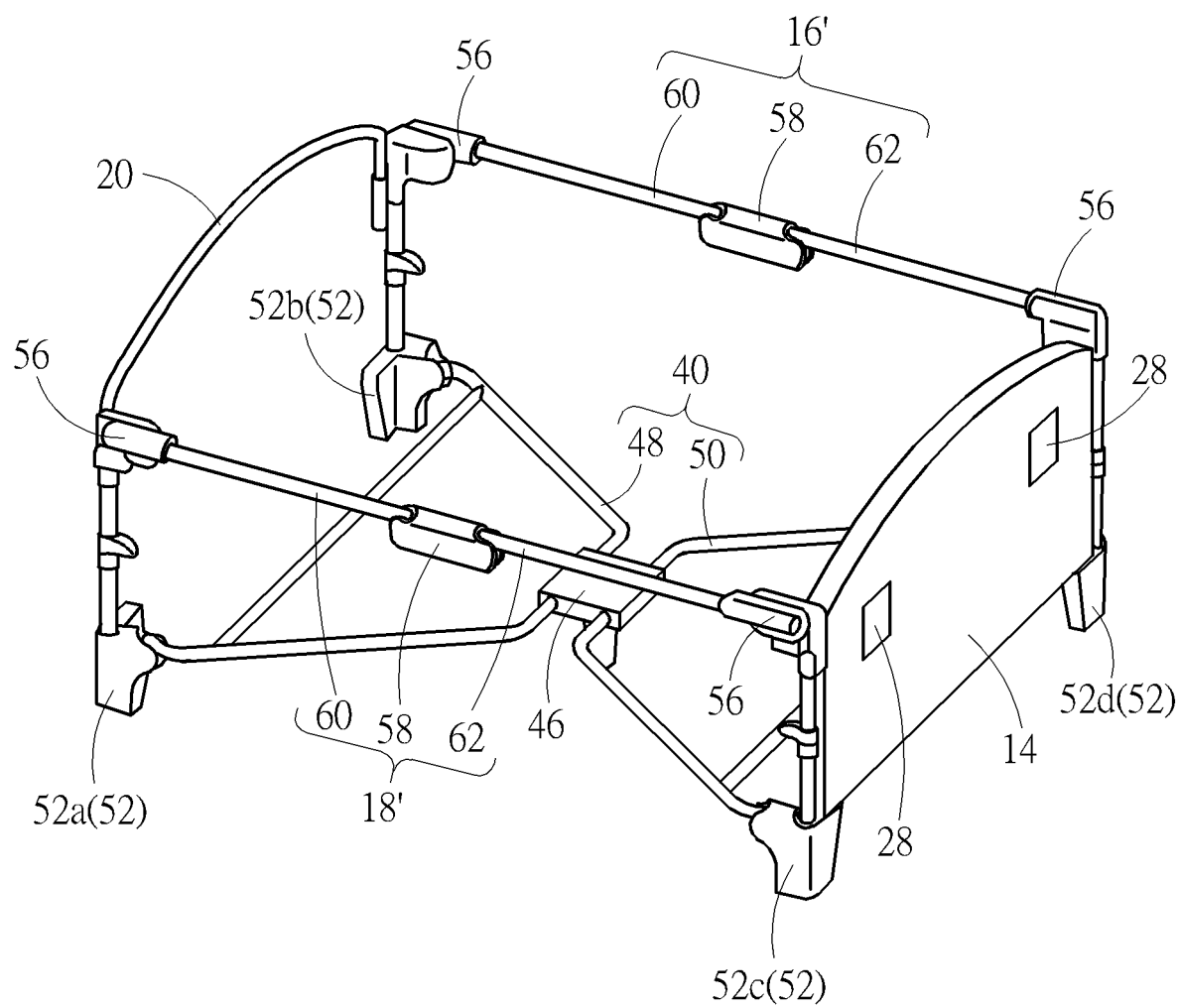
FIG. 8 and FIG. 9 respectively are diagrams of the travel bassinet indifferent operation modes according to a second embodiment of the present invention.
Figure 9:
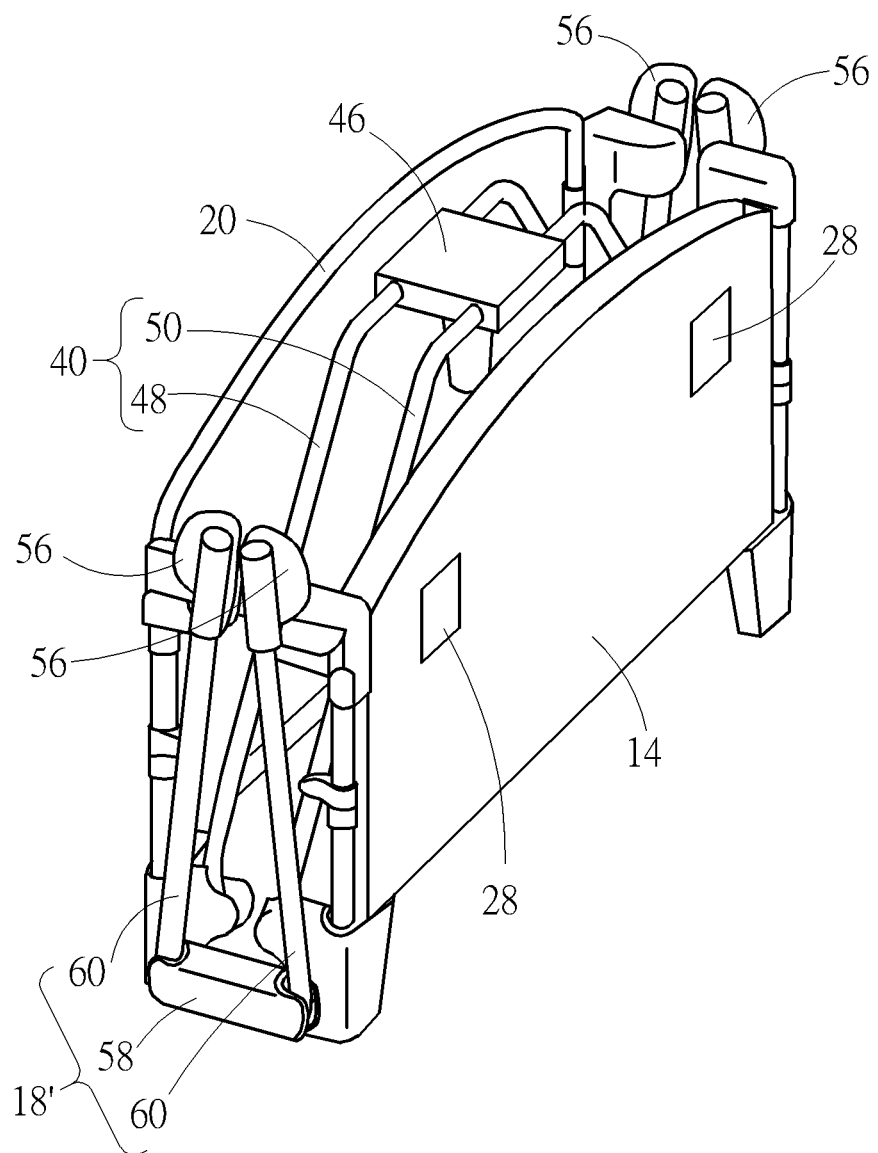

Please refer to FIG. 8 and FIG. 9. FIG. 8 and FIG. 9 respectively are diagrams of the travel bassinet 10 in different operation modes according to a second embodiment of the present invention. In the second embodiment, elements having the same numerals as ones of the above-mentioned embodiments have the same structures and functions, and a detailed description is omitted herein for simplicity. Difference between the foresaid embodiments is that the upper frame 38 in the second embodiment further includes a plurality of corner uprights 56 respectively disposed on the plurality of holders 42, and the first side structure 16' and the second side structure 18' are connected with the fixed end structure 20 and the foot structure 44 via the plurality of corner uprights 56. The first side structure 16' (and the second side structure 18') can include a pivot portion 58 and two bar portions 60 and 62. Two ends of the bar portion 60 (and the bar portion 62) are respectively connected with the pivot portion 58 and the corresponding corner upright 56.

While the first structural member 48 and the second structural member 50 stay in the unfolded position, as shown in FIG. 8, the bar portions 60 and 62 are parallel to steady the travel bassinet 10 in the unfolded position, and the foot structure 44 and the pivoting end panel 14 are far from the fixed end structure 20. For switching the first structural member 48 and the second structural member 50 from the unfolded position to the folded position shown in FIG. 9, the pivot portion 58 is lowered to downwardly rotate the bar portions 60 and 62 relative to the corner uprights 56 and the pivot portion 58 in a non-parallel state, and the pivoting joint module 46 is lifted to upwardly rotate the first structural member 48 and the second structural member 50, so that the foot structure 44 and the pivoting end panel 14 can be approached to the fixed end structure 20. In the second embodiment, the bar portions 60 and 62 may be laterally rotated relative to the corner uprights 56 and the pivot portion 58 while the travel bassinet 10 is folded.

Figure 10:
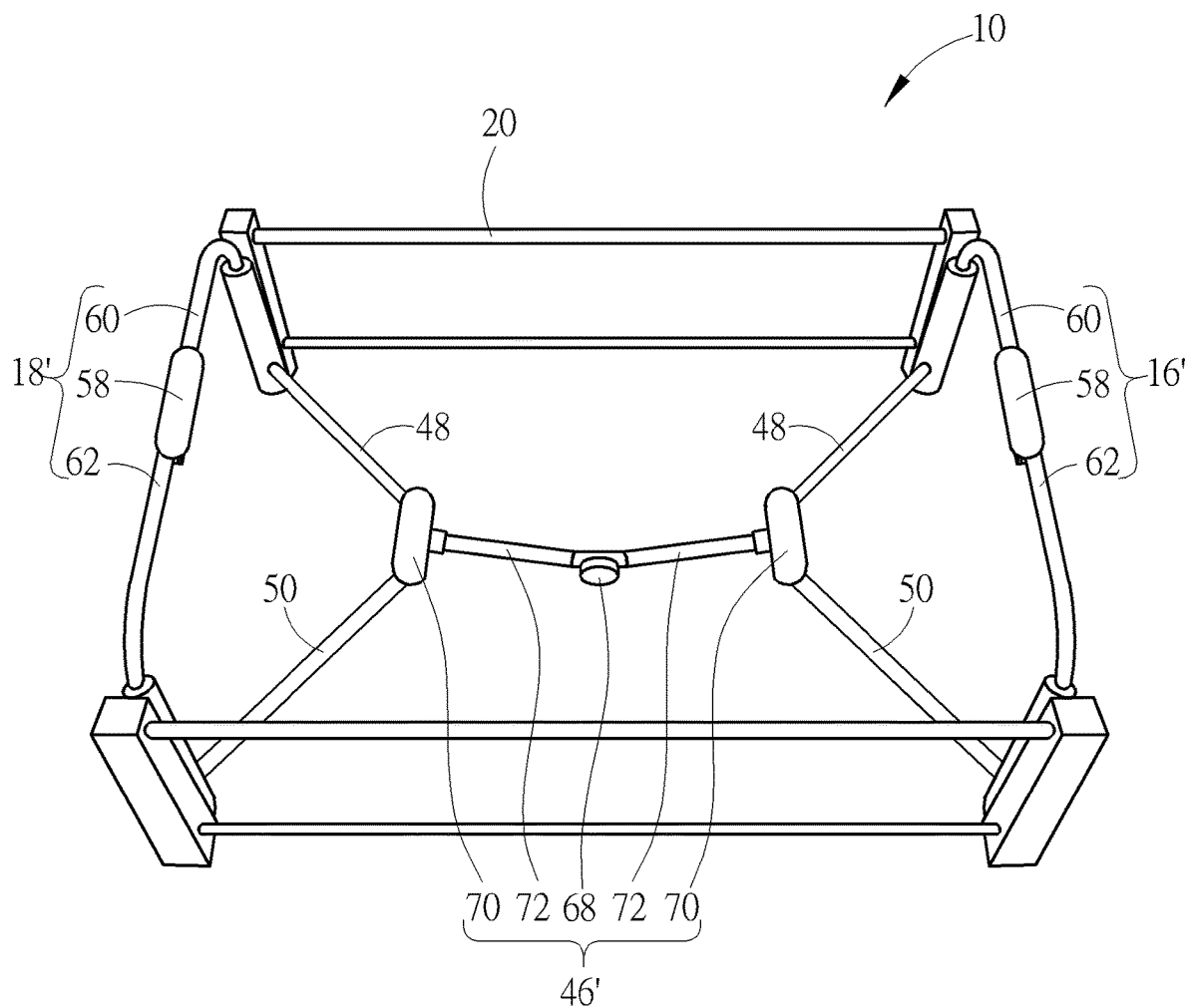
FIG. 10 and FIG. 11 respectively are diagrams of the travel bassinet indifferent operation modes according to a third embodiment of the present invention.
Figure 11:
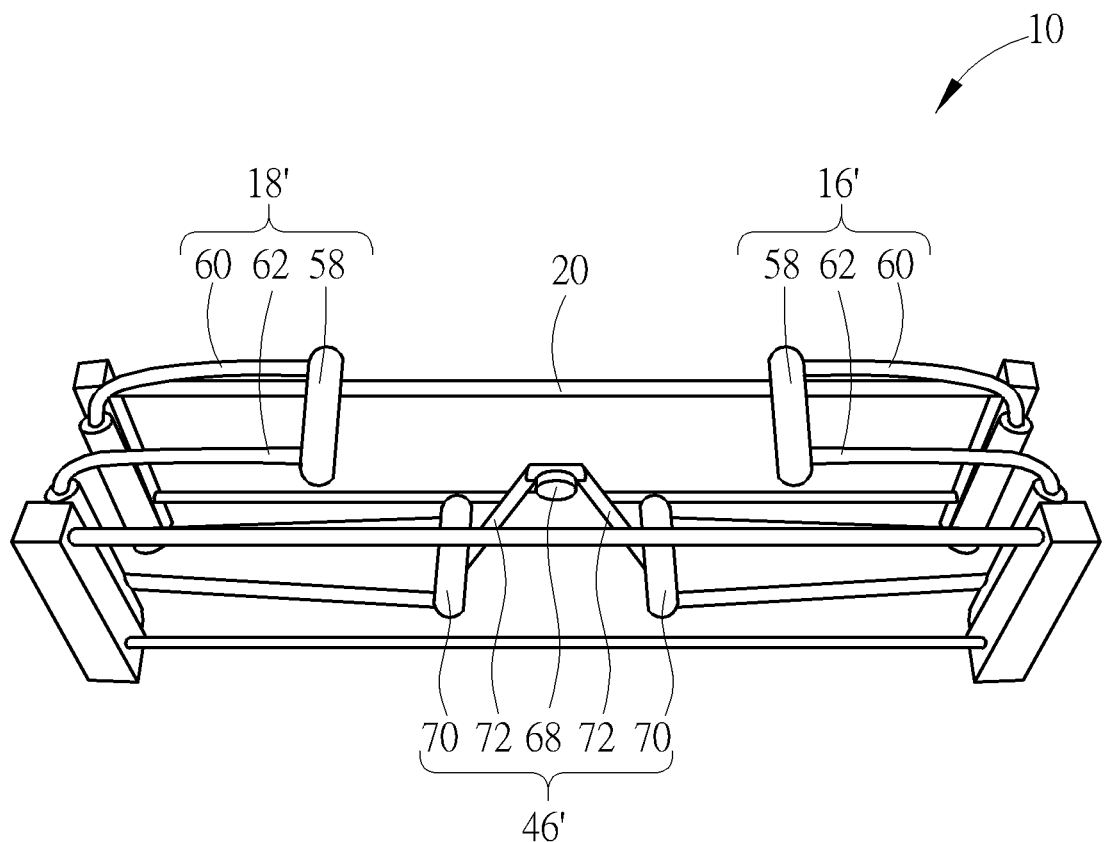

Please refer to FIG. 10 and FIG. 11. FIG. 10 and FIG. 11 respectively are diagrams of the travel bassinet 10 in different operation modes according to a third embodiment of the present invention. In the third embodiment, elements having the same numerals as ones of the above-mentioned embodiments have the same structures and functions, and a detailed description is omitted herein for simplicity. Difference between the embodiments is that the travel bassinet 10 in the third embodiment has the first side structure 16', the second side structure 18' and the pivoting joint module 46'. The pivoting joint module 46' can include a central pivot portion 68, two bridging pivot portions 70 and two linking portions 72. Each of the linking portions 72 is connected between the central pivot portion 68 and the corresponding bridging pivot portion 70, and each of the bridging pivot portions 70 is connected between the first structural member 48 and the second structural member 50.

While the travel bassinet 10 is switched from the unfolded position (shown in FIG. 10) to the folded position (shown in FIG. 11), the central pivot portion 68 are moved upward to lift the linking portions 72, and the linking portions 72 are near to close the bridging pivot portions 70, so that the first structural member 48 and the second structural member 50 can be rotated relative to the bridging pivot portions 70 and the legs 52 horizontally for approaching the fixed end structure 20 to the foot structure 44 and the pivoting end panel 14. In the meantime, the first side structure 16' and the second side structure 18' are folded by rotating the pivot portion 58 relative to the bar portions 60 and 62, which means the bar portions 60 and 62 can be rotated laterally and travel bassinet 10 can be folded conveniently.

For switching the travel bassinet 10 from the folded position to the unfolded position, the fixed end structure 20 is pulled away from the foot structure 44 and the pivoting end panel 14; the bar portions 60 and 62 are rotated from a parallel state (shown in FIG. 11) to an aligned state (shown in FIG. 10), and the central pivot portion 68 is lowered to allow separation of the bridging pivot portions 70, so the first structural member 48 and the second structural member 50 can be rotated relative to the bridging pivot portions 70 and the legs 52 horizontally so as to steady the travel bassinet 10 in the unfolded position.

Figure 12:
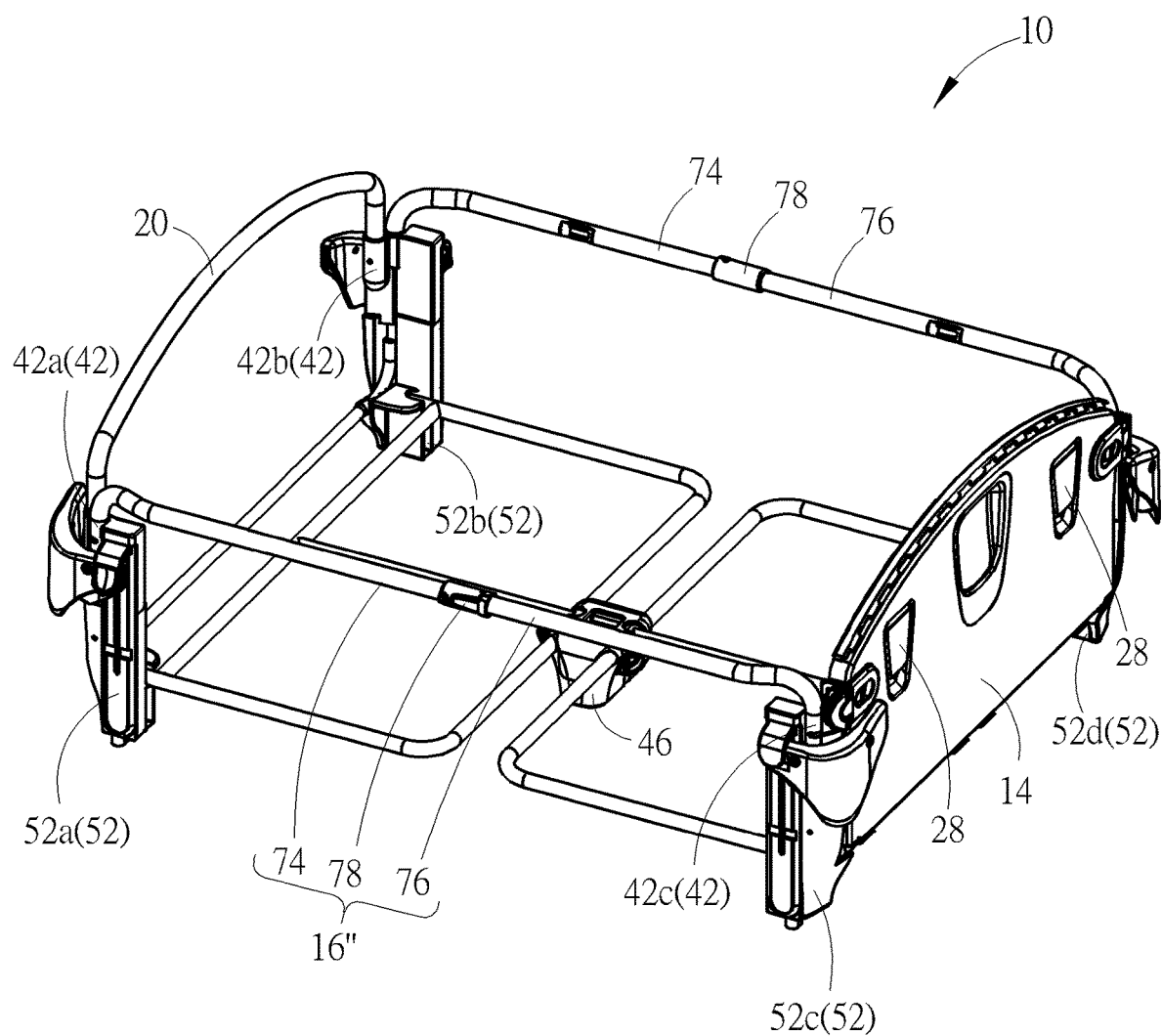
FIG. 12 to FIG. 14 respectively are diagrams of the travel bassinet indifferent operation modes according to a fourth embodiment of the present invention.
Figure 13:
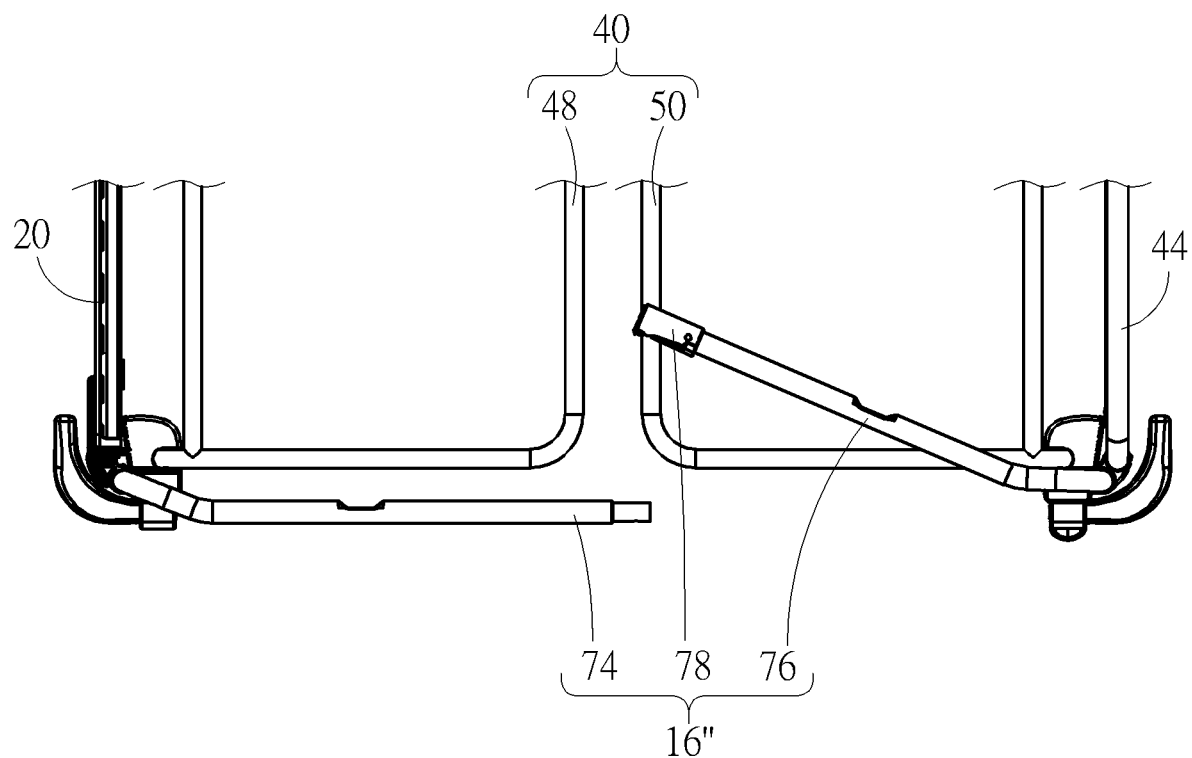
Figure 14:
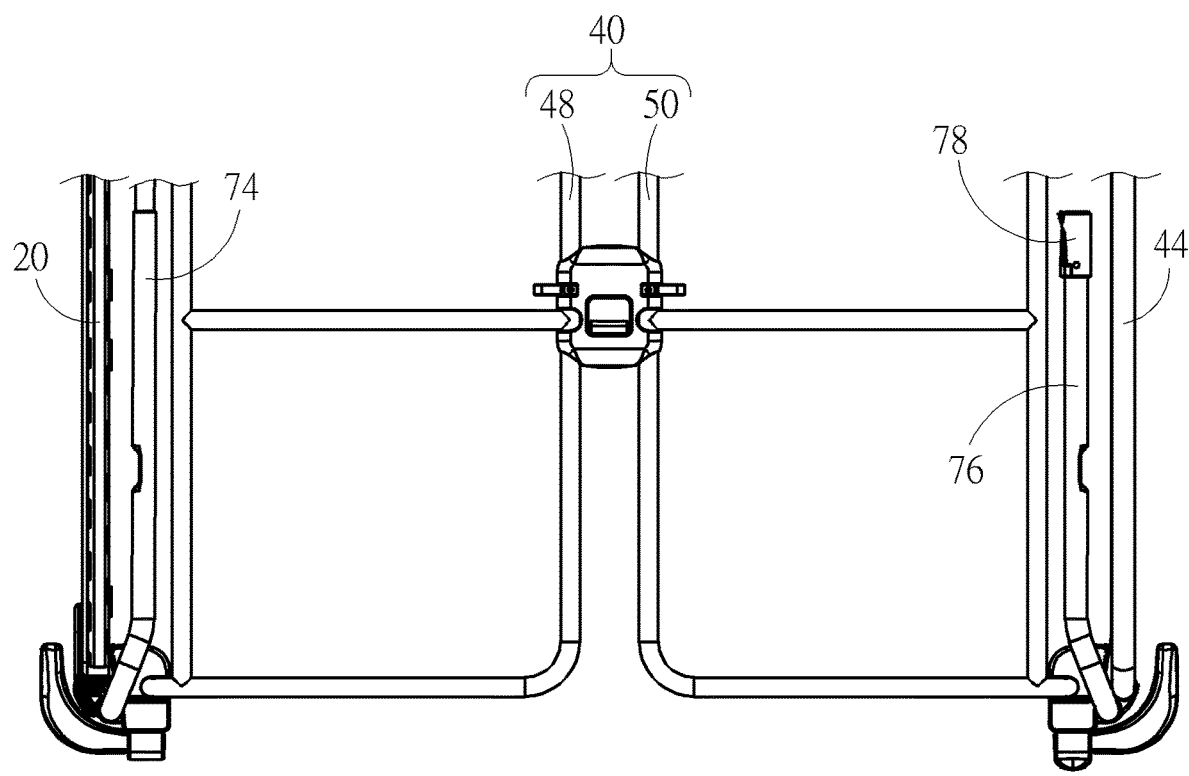
Figure 15:
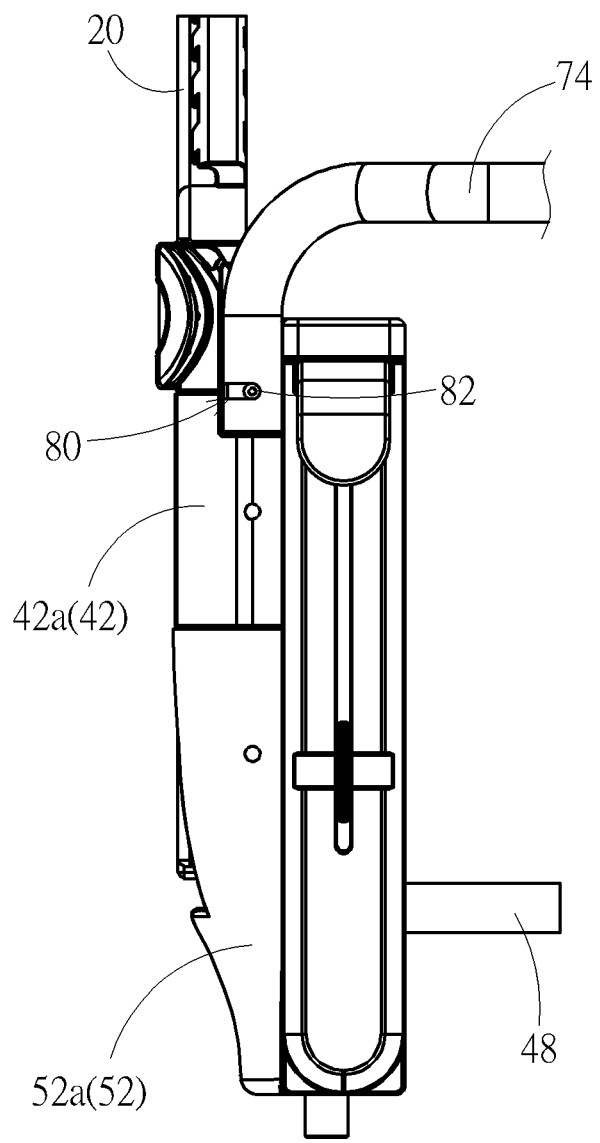
FIG. 15 is another view of the travel bassinet shown in FIG. 12.
Figure 16:
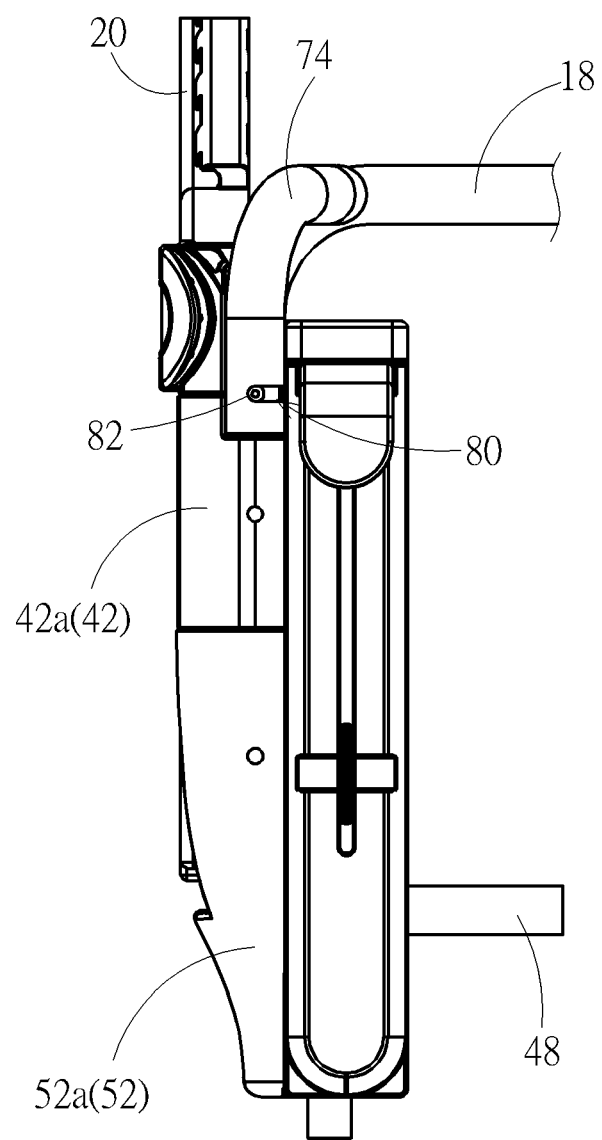
FIG. 16 is another view of the travel bassinet shown in FIG. 14.
Figure 17:
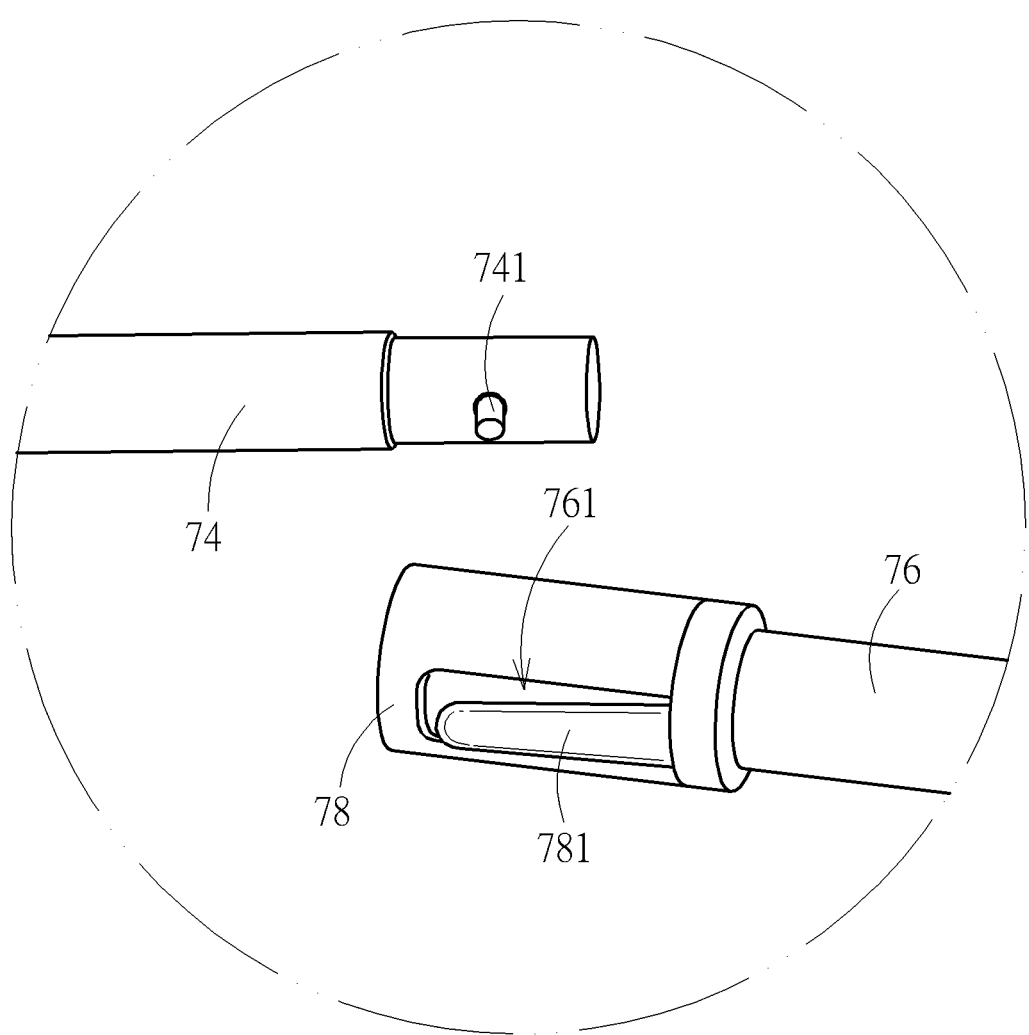
FIG. 17 is an enlarged diagram of a part of the first side structure according to the fourth embodiment of the present invention.

Please refer to FIG. 12 to FIG. 17. FIG. 12 to FIG. 14 respectively are diagrams of the travel bassinet 10 in different operation modes according to a fourth embodiment of the present invention. FIG. 15 is another view of the travel bassinet 10 shown in FIG. 12. FIG. 16 is another view of the travel bassinet 10 shown in FIG. 14. FIG. 17 is an enlarged diagram of a part of the first side structure 16" according to the fourth embodiment of the present invention. In the fourth embodiment, elements having the same numerals as ones of the above-mentioned embodiments have the same structures and functions, and a detailed description is omitted herein for simplicity. Difference between the embodiments is that the first side structure 16" in the fourth embodiment includes a first bar portion 74, a second bar portion 76 and a joint portion 78. The first bar portion 74 and the second bar portion 76 have substantially the same diameter and are respectively disposed on the foot structure 44 and the fixed end structure 20 via the holders 42 in the rotatable manner, and the joint portion 78 is disposed on the second bar portion 76 and detachably assembled with the first bar portion 74. The first bar portion 74 has an end segment with the diameter smaller than other part of the first bar portion 74, and a retractable pin 741 is disposed on the end segment of the first bar portion 74 and biased to retractably lock into a receiving hole 761 formed on an end segment of the second bar portion 76 covered by the joint portion 78. The joint portion 78 further integrally forms a flexible button 781 aligned to the retractable pin 741 on the end segment of the first bar portion 74, such that when the flexible button 781 is pressed, the retractable pin 741 of the first bar portion 74 is retracted from the receiving hole 761 on the end segment of the second bar portion 76 to unlock the second bar portion 76 from the first bar portion 74. In order to provide the space to allow the joint portion 78 to engage and disengage the first bar portion 74, the holders 42 are formed by plastic material such that the first side structure 16" is able to flex when the joint portion 78 is operated.

The joint portion 78 may be slidably disposed on the second bar portion 76, and a resilient component (not shown in figures) is connected between the joint portion 78 and the second bar portion accordingly. A resilient recovering force of the resilient component moves the joint portion 78 in a direction opposite to the first bar portion 74. When the flexible button 781 is pressed, the retractable pin 741 is retracted from the receiving hole 761, and the joint portion 78 can be pulled to the right by the resilient component, so as to unlock the second bar portion 76 from the first bar portion 74.

In the fourth embodiment, the first bar portion 74 and the second bar portion 76 are locked together by the retractable pin 741 of the first bar portion 74 and the receiving hole 761 of the second bar portion 76 while the travel bassinet 10 is set in the unfolded position, as shown in FIG. 12. For switching the travel bassinet 10 from the unfolded position to the folded position, the flexible button 781 integrally formed on the joint portion 78 is pressed to unlock the second bar portion 76 from the first bar portion 74, and the first bar portion 74 and the second bar portion 76 can be rotated relative to the holders 42 until the bar portions 74 and 76 are parallel to the fixed end structure 20 and the foot structure 44, as shown in FIG. 13 and FIG. 14. After that, the pivoting joint module 46 can be lifted to fold the first structural member 48 and the second structural member 50, and the fixed end structure 20 can be approached to the foot structure 44 and the pivoting end panel 14.

The first bar portion 74 (and the second bar portion 76) may have a constraining slot 80, and the fixed end structure 20 (which can be the foot structure 44 or the holder 42 related to the second bar portion 76) has a protrusion 82 slidably located inside the constraining slot 80. The first bar portion 74 can be rotated relative to the protrusion 82 through the constraining slot 80, and the protrusion 82 can be used to abut against ends of the constraining slot 80 to constrain rotation of the first bar portion 74, as shown in FIG. 15 and FIG. 16.

In conclusion, the travel bassinet has for use positions, and the lower frame and the upper frame of the travel bassinet can be adjusted according to the designated use position. The first use position is the travel bassinet can be put on the floor with the enclosed pivoting end panel; the second use position is the pivoting end panel can be removed from or unfolded relative to the travel bassinet put on the floor for the enlarged accommodating space; the third use position is the travel bassinet can be attached to the play yard frame at the low level position; and the fourth use position is travel bassinet can be attached to the play yard frame at the high level position. The lower frame and the upper frame are made by several foldable units, so the lower frame and the upper frame can be easily folded for easy transport of the travel bassinet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A travel bassinet, comprising:
   a lower frame, comprising:
      a pivoting joint module;
      a first structural member pivotally connected with the pivoting joint module, the first structural member being adapted to switch between a folded position and an unfolded position;
      a second structural member pivotally connected with the pivoting joint module and opposite to the first structural member, the second structural member being adapted to switch between the folded position and the unfolded position; and
      a plurality of legs comprising a first leg and a second leg pivotally connected with two ends of the first structural member, and further comprising a third leg and a fourth leg pivotally connected with two ends of the second structural member; and
   an upper frame assembled with the lower frame, the upper frame comprising:
      a plurality of holders comprising a first holder and a second holder respectively disposed on the first leg and the second leg, and further comprising a third holder and a fourth holder respectively disposed on the third leg and the fourth leg;
      a fixed end structure, two ends of the fixed end structure being respectively disposed on the first holder and the second holder;
      a foot structure connected between the third holder and the fourth holder, the foot structure being moved far from the fixed end structure while the first structural member and the second structural member are switched to the unfolded position, and being further moved close to the fixed end structure while the first structural member and the second structural member are switched to the folded position; and
      a pivoting end panel pivotally connected with the foot structure, the pivoting end panel is rotated to an upward position for enclosing an accommodating space of the travel bassinet and further rotated to a downward position for enlarging the accommodating space.

2. The travel bassinet of claim 1, wherein the pivoting joint module is lifted and lowered to switch the first structural member and the second structural member between the folded position and the unfolded position.

3. The travel bassinet of claim 1, wherein the pivoting end panel comprises a main body and a hinge portion, and the hinge portion is disposed on an edge of the main body and engaged with the foot structure.

4. The travel bassinet of claim 1, wherein the pivoting end panel comprises a main body, a support foot, a support foot latch, a panel latch and a release handle, the support foot is rotatably disposed on the main body, the support foot latch is movably disposed on the main body, the panel latch is movably disposed on the main body, the release handle is slidably disposed on the main body and connected with the support foot latch and the panel latch.

5. The travel bassinet of claim 4, wherein the release handle stays in a lock position to contact the support foot latch against the support foot so as to keep the support foot in a hiding position, and further to engage the panel latch with an engaging portion disposed on one of the third holder and the fourth holder so as to fasten the pivoting end panel on the upward position.

6. The travel bassinet of claim 5, wherein the release handle is moved from the lock position to an unlock position to disengage the panel latch from the engaging portion, and further to separate the support foot latch from the support foot.

7. The travel bassinet of claim 4, wherein the pivoting end panel further comprises a torsional spring disposed between the support foot and the main body, and a recovering force of the torsional spring is adapted to rotate the support foot from a hiding position to an exposing position.

8. The travel bassinet of claim 1, wherein the pivoting end panel is covered by fabric material.

9. The travel bassinet of claim 1, wherein the upper frame further comprises a first side structure and a second side structure respectively located between the fixed end structure and the foot structure.

10. The travel bassinet of claim 9, wherein the first side structure and the second side structure are detachably disposed on the plurality of holders.

11. The travel bassinet of claim 9, wherein the upper frame further comprises a plurality of corner uprights respectively disposed on the plurality of holders, the first side structure and the second side structure are connected with the fixed end structure and the foot structure via the plurality of corner uprights.

12. The travel bassinet of claim 11, wherein the first side structure comprises a pivot portion and two bar portions, two ends of each bar portion are respectively connected with the pivot portion and one of plurality of corner uprights.

13. The travel bassinet of claim 12, wherein the two bar portions are parallel while the first structural member and the second structural member stay in the unfolded position, and are rotated relative to the pivot portion in a non-parallel state while the first structural member and the second structural member stay in the folded position.

14. The travel bassinet of claim 12, wherein the two bar portions are rotated downwardly or laterally while the first structural member and the second structural member are switched from the unfolded position to the folded position.

15. The travel bassinet of claim 12, wherein the pivoting joint module is moved upward to drive rotation of the two bar portions relative to the pivot portion, so as to approach the fixed end structure and the foot structure by folding the first structural member and the second structural member accordingly.

16. The travel bassinet of claim 1, wherein the pivoting joint module comprises a plate portion with two axle holes, and the first structural member and the second structural member are respectively assembled with the two axle holes.

17. The travel bassinet of claim 16, wherein the pivoting joint module further comprises a protruding portion disposed under the plate portion.

18. The travel bassinet of claim 16, wherein the first structural member and the second structural member are folded and unfolded vertically to approach the fixed end structure and the foot structure.

19. The travel bassinet of claim 1, wherein one of the upper frame and the lower frame is attached to a play yard frame to suspend the travel bassinet above a floor.

\* \* \* \* \*